(12) United States Patent
Kook

(10) Patent No.: US 8,704,628 B2
(45) Date of Patent: Apr. 22, 2014

(54) WIRELESS POWER TRANSMISSION SYSTEM, WIRELESS POWER TRANSMISSION APPARATUS AND WIRELESS POWER RECEIVING APPARATUS THEREFOR

(75) Inventor: Yoon-Sang Kook, Gwacheon-si (KR)

(73) Assignee: Hanrim Postech Co., Ltd., Suwon-si, Gyeonggi-do (KR)

( * ) Notice: Subject to any disclaimer, the term of this patent is extended or adjusted under 35 U.S.C. 154(b) by 9 days.

(21) Appl. No.: 13/189,679

(22) Filed: Jul. 25, 2011

(65) Prior Publication Data

US 2012/0188041 A1 Jul. 26, 2012

(30) Foreign Application Priority Data

Jul. 23, 2010 (KR) ........................ 10-2010-0071243

(51) Int. Cl.
*H01F 27/24* (2006.01)
*H01F 17/04* (2006.01)
*H02J 7/00* (2006.01)

(52) U.S. Cl.
USPC ............................ 336/212; 336/221; 320/107

(58) Field of Classification Search
USPC ......... 336/118, 119, 126, 130, 131, 132, 211, 336/212, 221; 320/107, 108, 109
See application file for complete search history.

(56) References Cited

U.S. PATENT DOCUMENTS

| 3,602,814 | A | * | 8/1971 | Quirk | 324/137 |
|---|---|---|---|---|---|
| 4,689,592 | A | * | 8/1987 | Walker | 336/83 |
| 4,766,365 | A | * | 8/1988 | Bolduc et al. | 323/308 |
| 5,536,979 | A | * | 7/1996 | McEachern et al. | 307/104 |
| 5,619,400 | A | * | 4/1997 | Bowman et al. | 363/15 |
| 6,016,054 | A | * | 1/2000 | Slater et al. | 324/142 |
| 6,281,776 | B1 | * | 8/2001 | Davidson | 336/61 |
| 6,389,318 | B1 | | 5/2002 | Zarinetchi et al. | |
| 6,462,509 | B1 | * | 10/2002 | Abe et al. | 320/108 |
| 6,489,874 | B2 | * | 12/2002 | Katsura et al. | 336/130 |
| 6,501,364 | B1 | | 12/2002 | Hui et al. | |
| 6,906,495 | B2 | * | 6/2005 | Cheng et al. | 320/108 |
| 7,136,293 | B2 | * | 11/2006 | Petkov et al. | 363/126 |
| 7,164,255 | B2 | | 1/2007 | Hui | |
| 7,576,514 | B2 | | 8/2009 | Hui | |
| 7,872,445 | B2 | | 1/2011 | Hui | |
| 7,917,086 | B2 | * | 3/2011 | Kondo et al. | 455/41.1 |
| 2002/0041176 | A1 | * | 4/2002 | Eki | 320/109 |
| 2011/0221387 | A1 | * | 9/2011 | Steigerwald et al. | 320/108 |

* cited by examiner

*Primary Examiner* — Alexander Talpalatski
*Assistant Examiner* — Joselito Baisa
(74) *Attorney, Agent, or Firm* — Stein IP, LLC

(57) ABSTRACT

Provided are a wireless power communication system, including: a primary core where a primary coil, to which a current is applied, is wound; and a secondary core having a width wider than a width of the primary core, and receiving a secondary coil which outputs a current generated by a magnetic field, wherein the magnetic field is induced by the primary coil to the secondary coil, a wireless power transmission apparatus and a wireless power receiving apparatus therefor.

14 Claims, 7 Drawing Sheets

WIRELESS POWER TRANSMISSION SYSTEM, WIRELESS POWER TRANSMISSION APPARATUS AND WIRELESS POWER RECEIVING APPARATUS THEREFOR

CROSS-REFERENCE TO RELATED APPLICATIONS

This application claims priority to Korean Patent Application No. 10-2010-0071243, filed on Jul. 23, 2010, which is herein incorporated by reference in its entirety.

BACKGROUND OF THE INVENTION

1. Field of the Invention

The present invention relates to a wireless power communication system, a wireless power transmission apparatus and a receiving apparatus therefor.

2. Description of Related Art

Generally, a rechargeable secondary battery is mounted on portable electronic devices such as a mobile communication terminal and Personal Digital Assistants (PDA). An individual charging device for supplying electric energy to a battery of a portable electronic device using commercial standard power sources is required for charging the battery.

The charging device and the battery usually include an external contact terminal, respectively. The charging device and the battery are electrically connected by contacting the two contact terminals to each other. When the contact terminal is protruded to the outside, it ruins the beauty and there is a possibility that the contact terminal is contaminated by foreign substances to easily deteriorate the contact state. Also, when a short occurs in the battery due to user's carelessness or when the battery is exposed to moisture, charging energy may easily dissipate.

As an alternative of the contact charging method, a non-contact (wireless) charging system for charging a battery without contact between each contact terminal of the charging device and the battery is suggested.

SUMMARY OF THE INVENTION

An embodiment of the present invention is to provide a wireless power communication system for reducing leakage of a magnetic field during wireless power communication, a wireless power transmission apparatus and a receiving apparatus therefor.

According to one embodiment of the present invention, provided is a wireless power communication system, including: a primary core receiving a primary coil, to which a current is applied; a secondary core having a width wider than a width of the primary core, and receiving a secondary coil which outputs a current generated by a magnetic field, wherein the magnetic field is induced by the primary coil to the secondary coil.

The primary coil includes: a primary middle protruding portion where the primary coil is wound; and a primary edge protruding portion spaced from the primary middle protruding portion, and surrounding the primary middle protruding portion, and the secondary core includes: a secondary middle protruding portion where the secondary coil is wound; and a secondary edge protruding portion spaced from the secondary middle protruding portion, and surrounding the secondary middle protruding portion.

When the primary and secondary middle protruding portions are disposed to face each other, the primary edge protruding portion is formed to be disposed between the secondary middle protruding portion and the secondary edge protruding portion.

The secondary edge protruding portion of the secondary core is formed to be protruded such that the secondary edge protruding portion surrounds a portion of the primary edge protruding portion of the primary core.

Two adjacent surfaces of the secondary edge protruding portion are disposed to face two adjacent surfaces of the primary edge protruding portion, respectively.

The system further includes: a primary housing receiving the primary core, wherein the primary housing includes a protruded portion corresponding to the primary edge protruding portion.

The system further includes: a secondary housing receiving the secondary core, wherein the secondary housing includes a recessed portion, into which the primary edge protruding portion is inserted.

The secondary coil is configured to output a current transformed by a turns ratio of the primary coil and the secondary coil.

The system further includes: a driving mechanism for driving any one of the primary and secondary cores to move the one toward the other.

The system further includes: a sensor for sensing whether any one of the primary and secondary cores approaches to the other, wherein the driving mechanism is driven based on a sensing result of the sensor.

According to another embodiment of the present invention, provided is a wireless power transmission apparatus, including: a primary coil where a magnetic field is induced by an applied current such that an output current of a secondary coil is induced; and a primary core having a width narrower than a width of a secondary core where the secondary coil is wound, wherein the primary coil is wound to the primary core.

The primary core includes: a middle protruding portion where the primary coil is wound; and an edge protruding portion spaced from the middle protruding portion, and surrounding the middle protruding portion.

The edge protruding portion of the primary core is partially surrounded by both ends of the secondary core.

A protrusion level of the edge protruding portion of the primary core is larger than a protrusion level of the middle protruding portion of the primary core.

The wireless power transmission apparatus further includes: a driving mechanism for driving the primary core such that the primary core moves toward the secondary core.

The wireless power transmission apparatus further includes: a sensor for sensing whether the secondary core is approached to the primary core, wherein the driving mechanism is driven based on a sensing result of the sensor.

According to still another embodiment of the present invention, provided is a wireless power receiving apparatus, including: a secondary coil formed to output a current by a magnetic field induced by a current, which is applied to a primary coil; and a secondary core having a width wider a width that of a primary core where the primary coil is wound, wherein the secondary coil is wound to the secondary core.

The secondary core includes: a middle protruding portion, which the secondary coil is wound to; and an edge protruding portion spaced from the middle protruding portion and surrounding the middle protruding portion.

A protrusion level of the edge protruding portion of the secondary core is smaller than a protrusion level of the middle protruding portion of the secondary core.

The edge protruding portion of the secondary core partially surrounds both ends of the primary core.

DESCRIPTION OF SPECIFIC EMBODIMENTS

Figure 1:
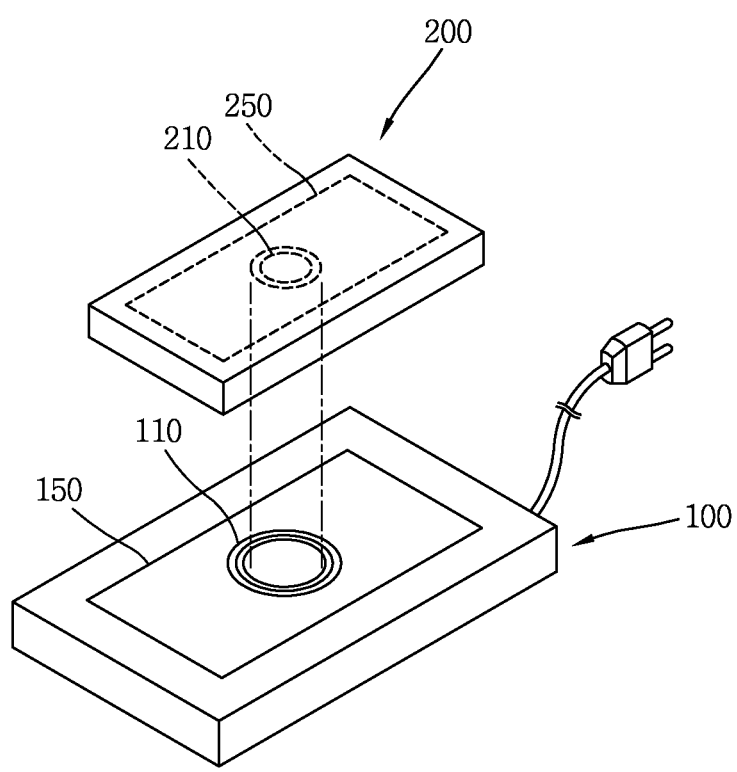
FIG. 1 is a perspective view showing a wireless power communication system in accordance with an exemplary embodiment.

Hereinafter, a wireless power communication system in accordance with an exemplary embodiment of the present invention, a wireless power transmission apparatus and a wireless power receiving apparatus therefor will be described in detail with reference to the accompanying drawings. In all embodiments of this specification, the same or similar constituent elements have the same or similar reference numeral and the same description on the same or similar constituent elements in different exemplary embodiments will be identically applied.

FIG. 1 is a perspective view showing a wireless power communication system in accordance with an exemplary embodiment.

Referring to FIG. 1, the wireless power communication system includes a wireless power transmission apparatus 100 and a wireless power receiving apparatus 200 for receiving power from the wireless power transmission apparatus 100 without contact in order to charge a battery.

The wireless power transmission apparatus 100 is an apparatus for receiving electric energy from an external power source and generating charging power to be supplied to the wireless power receiving apparatus 200. The wireless power transmission apparatus 100 may be formed of a pad type for the safe receipt of the wireless power receiving apparatus 200. A commercial alternating current (AC) power source (60 Hz, 220V/100V) or a direct current (DC) power source may be adopted as an external power source to be supplied to the wireless power transmission apparatus 100.

The wireless power receiving apparatus 200 includes a battery pack with a built-in battery or a portable electronic device with a built-in battery pack. Also, the wireless power receiving apparatus 200 may be a portion of a portable electronic device having contact with a battery or a member having contact with a battery separately from the portable electronic device. Examples of the portable electronic device include a cellular phone, Personal Digital Assistant (PDA) and an MP3 player. The battery may include a lithium ion battery or a lithium polymer battery as a rechargeable battery cell.

The wireless power transmission apparatus 100 and the wireless power receiving apparatus 200 include a primary coil 110 and a secondary coil 210 corresponding to each other. The primary and secondary coils 110 and 210 are magnetically coupled to each other by inductive coupling. Since the secondary coil 210 is juxtaposed with the primary coil 110, an induced current inside the secondary coil 210 is induced by a magnetic field generated by the primary coil 110.

Figure 2:
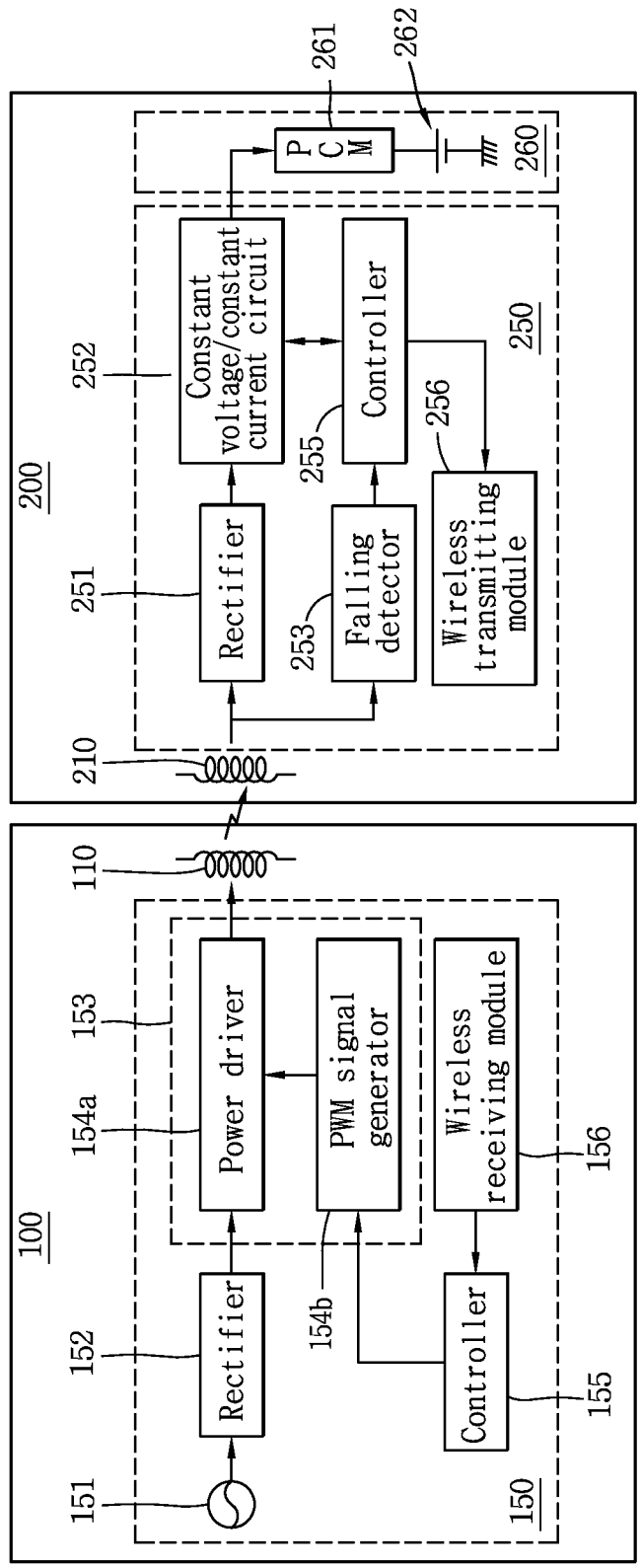
FIG. 2 is a block diagram showing internal functions of the wireless power communication system of FIG. 1.

The wireless power transmission apparatus 100 has a charging power supply circuit 150 for generating a magnetic field by driving the primary coil 110 (see FIG. 2). The wireless power receiving apparatus 200 has a charging circuit 250 for charging a battery by using the electromagnetic induction induced by the secondary coil 210 (see FIG. 2).

Hereinafter, detailed configurations of the charging power supply circuit 150 and the charging circuit 250 will be described with reference to FIG. 2. FIG. 2 is a block diagram showing internal functions of a wireless power communication system of FIG. 1.

Referring to FIG. 2, the charging power supply circuit 150 provided within the wireless power transmission apparatus 100 includes a rectifier 152, a driving circuit 153, a controller 155, and a wireless receiving module 156.

The rectifier 152 rectifies AC voltage from a commercial alternating power source 151 into DC and transmits the rectified DC to the driving circuit 153. The driving circuit 153 generates a high frequency AC voltage pulse over the commercial frequency by using the DC voltage rectified by the rectifier 152, and generates a magnetic field by applying the generated high frequency AC voltage pulse to the primary coil 110.

The driving circuit 153 may include a power driver 154a and a pulse width modulation (PWM) signal generator 154b. The power driver 154a includes a high frequency oscillator circuit (not shown) for oscillating high frequency AC voltage over a commercial frequency by converting DC voltage of a predetermined level and a drive circuit (not shown) for driving the primary coil 110 by applying the pulse width modulated-high frequency AC voltage pulse to the primary coil 110. The PWM signal generator 154b performs pulse width modulation of the high frequency AC voltage. An output signal outputted through an output end of the power driver 153 becomes a high frequency AC voltage pulse. The high frequency AC voltage pulse is a pulse train and the pulse width of the pulse train is controlled by the controller 155. Examples of the driving circuit 153 may include a switching mode power supply (SMPS).

The controller 155 controls the pulse width of the pulse width modulated-high frequency AC voltage pulse based on charging state information of a battery that is fed back via wireless transmitting and receiving modules 156 and 256. For example, when a response signal fed back from the charging circuit 250 is a charging start signal, the controller 155 converts a driving mode of the primary coil 110 from a waiting mode into a charging mode. When it is determined based on an analysis result of the charging state information fed back from the charging circuit 250 that the battery is fully charged, the controller 155 converts a driving mode of the primary coil 110 from a charging mode into a transitional mode. When there is no response signal fed back from the charging circuit 250, the controller 155 maintains the driving mode of the primary coil 110 as a waiting mode.

Since the primary coil 110 receives a feedback response signal from the wireless transmitting module 256 of the charging circuit 250, a wireless receiving module 156 includes a demodulator (not shown) for demodulating the feedback response signal and recovering charging state information of a battery 262. The wireless receiving module 156 may further include an antenna for receiving a feedback response signal from the wireless transmitting module 256 of the charging circuit 250 separately from the primary coil 110.

The charging power supply circuit 150 may further include an overvoltage filter circuit for protecting the circuit from abnormal overvoltage and a constant voltage circuit for maintaining the DC voltage rectified by the rectifier 152 at a predetermined level. The overvoltage filter circuit is disposed between the commercial alternating power source 151 and the rectifier 152. The constant voltage circuit may be disposed between the rectifier 152 and the driving circuit 153.

The charging circuit 250 for charging the battery 262 by receiving power from the charging power supply circuit 150 will be described hereinafter. The charging circuit 250 is built in the wireless power receiving apparatus 200.

The charging circuit 250 includes a rectifier 251, a constant voltage/constant current circuit 252, a falling detector 253, a controller 255, and the wireless transmitting module 256.

The rectifier 251 is connected to an output end of the secondary coil 210 to equalize the AC voltage pulse induced by the secondary coil 210 into DC of a predetermined level. The constant voltage/constant current circuit 252 generates constant voltage and a constant current to be charged to the battery 262 by using the DC voltage of a predetermined level. To be specific, a constant current mode is maintained at an initial charging stage of the battery 262 but it is converted into a constant voltage mode in a state that the charging voltage of the battery 262 is fully charged.

The falling detector 253 is a device for detecting a falling time of the AC voltage pulse induced by the secondary coil 210. The falling detection signal is input into the controller 255.

The controller 255 as a kind of a micro processor receives a monitoring signal such as a falling detection signal, a charging current and charging voltage, etc. The controller 255 controls the constant voltage/constant current circuit 252 and the wireless transmitting module 256 based on the monitoring signal. For example, the controller 255 grasps a falling time of the pulse based on the falling detection signal, which is input from the falling detector 253, and synchronizes a transmitting time of a feedback response signal to be transmitted to the charging power supply circuit 150 to the falling time of the pulse. The controller 255 monitors the charging current and the charging voltage of the battery 262 and temporarily stores the monitored values into an internal memory (not shown). The memory additionally stores specifications of the battery 262 including a product code and a rating, etc. as well as information on the charging state of the battery 262 such as the monitored charging current and charging voltage.

The controller 255 properly selects and converts a constant voltage mode and a constant current mode according to the charging state of the battery 262. The controller 255 monitors whether excessive voltage is applied to both ends of the constant voltage/constant current circuit 252. When excessive voltage is applied, the controller 255 generates a signal of requesting adjustment of the charging power. The adjustment request signal is fed back to the charging power supply circuit 150 in the wireless power transmission apparatus 100 via the wireless transmitting module 256.

A monitoring operation on the voltage of both the ends of the constant voltage/constant current circuit 252 is performed by detecting a front end voltage and a rear end voltage of the constant voltage/constant current circuit 252 and checking whether a difference value between the front end voltage and the rear end voltage excesses a reference value. The wireless transmitting module 256 includes a transmitting unit of generating a feedback response signal by modulating a baseband signal such as charging state information, when the secondary coil 210 sends a feedback response signal including a charging start signal, a charging state signal, and an adjustment request signal to be transmitted to the charging power supply circuit 150. The wireless receiving module 256 may include an antenna for transmitting a feedback response signal to the charging power supply circuit 150 separately from the secondary coil 210. A Protective Circuit Module (PCM) 261 for preventing application of excessive voltage or current to the battery 262 is disposed between the constant voltage/constant current circuit 252 and the battery 262. The PCM 261 and the battery 262 may form one battery unit 260.

Arrangement of a primary core 120 and a secondary 220 between the wireless power transmission apparatus 100 and the wireless power receiving apparatus 200 will be described in detail hereinafter.

Figure 3:
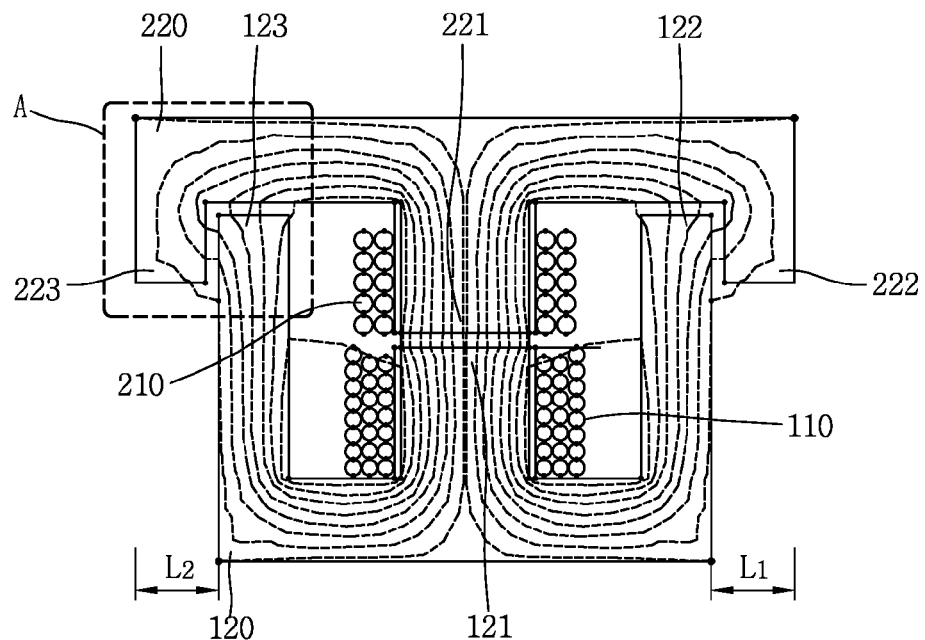
FIG. 3 is a schematic view showing an arrangement of cores 120 and 220 where coils 110 and 210 of FIG. 1 are wound.

FIG. 3 is a schematic view showing the arrangement of the primary and secondary cores 120 and 220 where the primary and secondary coils 110 and 210 of FIG. 1 are wound.

Referring to FIG. 3, the cores 120 and 220 are disposed such that the primary core 120 faces the secondary core 220 each other.

The primary core 120 is built in the wireless power transmission apparatus 100. The primary core 120 includes a primary middle protruding portion 121, and primary edge protruding portions 122 and 123. Accordingly, the primary core 120 has a shape of a letter 'E'. The primary coil 110 may be wound onto the primary middle protruding portion 121.

Differently, the primary core 120 may include a middle protruding portion and a circumferential edge protruding portion, which is formed to be spaced from the middle protruding portion and continuously protruded along a circumferential direction, to have a POT shape.

The secondary core 220 is built in the wireless power receiving apparatus 200. The secondary core 220 includes a secondary middle protruding portion 221, and secondary edge protruding portions 222 and 223. Accordingly, the secondary core 220 may have a shape of a letter 'E'. The secondary coil 210 may be wound onto the secondary middle protruding portion 221.

Differently, the secondary core 220 may include a middle protruding portion and a circumferential edge protruding portion, which is formed to be spaced from the middle protruding portion and continuously protruded along a circumferential direction, to have a POT shape.

According to the present exemplary embodiment, the primary core 120 and the secondary core 220 respectively have a shape of a letter 'E' to face each other. The secondary core 220 may be formed to be extended larger than the primary core 120 along a line of connecting both ends of the primary core 120. That is, a width of the secondary core 220 is larger than that of the primary core 120. As a result, one end of the secondary core 220 is extended as long as one length $L_1$ to be longer than that of the primary core 120. The other end is extended as long as one length $L_2$ to be longer than that of the primary core 120. Accordingly, a magnetic field of the primary core 120 has a lower possibility of leakage to be stably extended to the secondary core 220.

In connection with the width difference, the edge protruding portions 122 and 123 of the primary core 120 may be respectively disposed between the edge protruding portions 222 and 223 and the secondary middle protruding portion 221 of the secondary core 220. The primary middle protruding portion 121 of the primary core 120 may be disposed to face the secondary middle protruding portion 221 of the secondary core 220 each other.

The edge protruding portions 222 and 223 of the secondary core 220 may be protruded to surround a portion of the ends of the edge protruding portions 122 and 123 of the primary core 120. Accordingly, the edge protruding portions 122 and 123 of the primary core 120 may be formed to be more protruded than the primary middle protruding portion 121. Reversely, the edge protruding portions 222 and 223 of the secondary core 220 may be formed to be less protruded than the secondary middle protruding portion 221.

Figure 4:
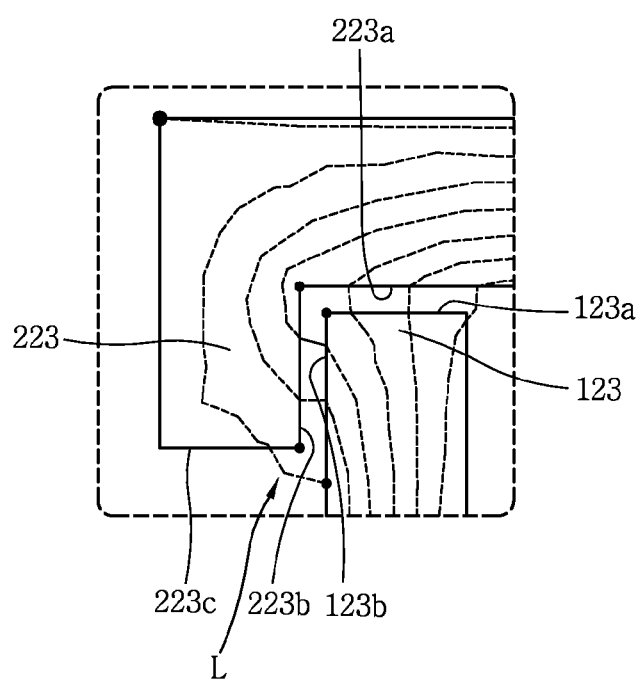
FIG. 4 is a magnifying view showing a portion A of FIG. 3.

FIG. 4 is a magnifying view showing a portion A of FIG. 3.

Referring to FIG. 4, two adjacent surfaces 123a and 123b of the edge protruding portion 123 of the primary core 120 may be disposed to face two adjacent surfaces 223a and 223b of the edge protruding portion 223 of the secondary core 220.

To be specific, the surface 123a at a protruded end portion of the edge protruding portion 123 of the primary core 120 faces the neighboring surface 223a that is extended to the edge protruding portion 223 of the secondary core 220. Accordingly, a magnetic field of the edge protruding portion 123 is extended from the surface 123a at the protruded end portion to the surface 223a.

The outer surface 123b of the edge protruding portion 123 of the primary core 120 faces the neighboring inner surface 223b of the edge protruding portion 223 of the secondary core 220. Accordingly, a magnetic field of the outer surface 123b of the edge protruding portion 123 is extended to the inner surface 223b.

In addition, a magnetic field out of the inner surface 223b among the magnetic fields of the outer surface 123b is extended through the surface 223c at the end portion of the edge protruding portion 223, thereby reducing the leakage level of the magnetic field.

Figure 5:
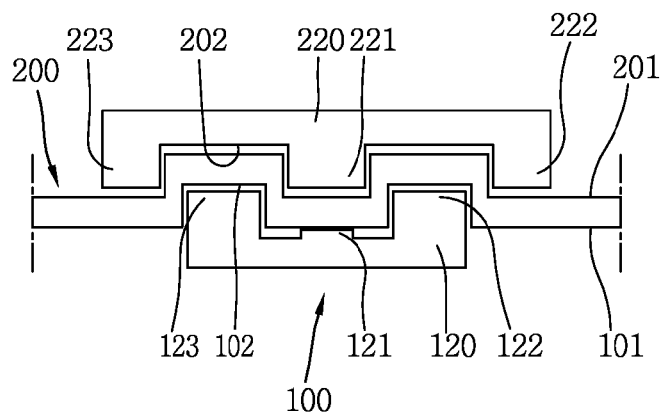
FIG. 5 is a cross-sectional view partially showing an arrangement that a wireless power transmission apparatus 100 and a wireless power receiving apparatus 200, each having the core 120 or the core 220 of FIG. 3, are disposed closely.

FIG. 5 is a cross-sectional view partially showing an arrangement that a wireless power transmission apparatus 100 and a wireless power receiving apparatus 200, each having the core 120 or the core 220 of FIG. 3, are disposed closely.

Referring to FIG. 5, a primary housing 101 forms an outer shape of the wireless power transmission apparatus 100. The primary core 120 is built in the primary housing 101. A protruded portion 102 corresponding to the edge protruding portion 123 of the primary core 120 is formed on the primary housing 101.

A secondary housing 201 forms an outer shape of the wireless power receiving apparatus 200. The secondary core 220 is built in the secondary housing 201. A recessed portion 202 corresponding to the arrangement between the secondary middle protruding portion 221 and the edge protruding portion 223 of the secondary core 220 may be formed on the secondary housing 201.

According to the above-mentioned configuration, the protruded portion 102 of the wireless power transmission apparatus 100 may be inserted into the recessed portion 202 of the wireless power receiving apparatus 200. Therefore, the alignment between the primary core 120 of the wireless power transmission apparatus 100 and the secondary core 220 of the wireless power receiving apparatus 200 may be easily made as intended.

Figure 6:
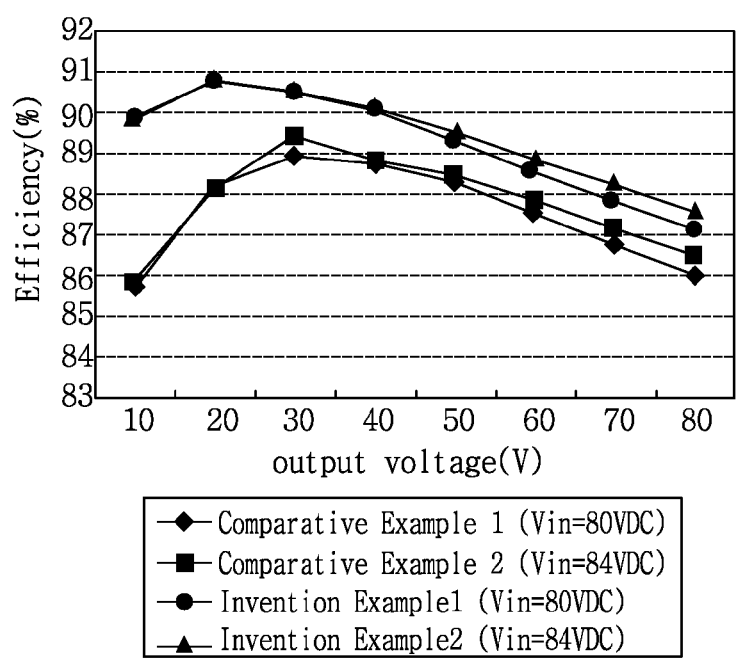
FIG. 6 is a graph showing a comparison test result of the wireless power communication system in accordance with an exemplary embodiment and Comparative Example.

FIG. 6 is a graph showing a comparison test result of the wireless power communication system in accordance with an exemplary embodiment and Comparative Example.

Referring to FIG. 6, the wireless power communication system may function as a transformer for increasing or decreasing input voltage by a turns ratio between the primary coil 110 wound to the primary core 120 (see FIGS. 1 and 3) and the secondary coil 210 wound to the secondary core 220.

Comparative Examples 1 and 2 show the case that the width of the primary core is the same as that of the secondary core. As described above, in Invention Examples 1 and 2, the width of the secondary core 220 is larger than that of the primary core 120. In Comparative Example 1 and Invention Example 1, input voltage is 80V (DC). In Comparative Example 2 and Invention Example 2, input voltage is 84V (DC).

The efficiency according to the output voltage in Comparative Examples 1 and 2 ranges from a minimum of 86% to a maximum of 89.5%. Meanwhile, the efficiency according to the output voltage in Invention Examples 1 and 2 ranges from a minimum of 87.5% to a maximum of 91%. As a result, the efficiency is improved to 1.5% in Invention Examples in comparison with Comparative Examples.

Figure 7:
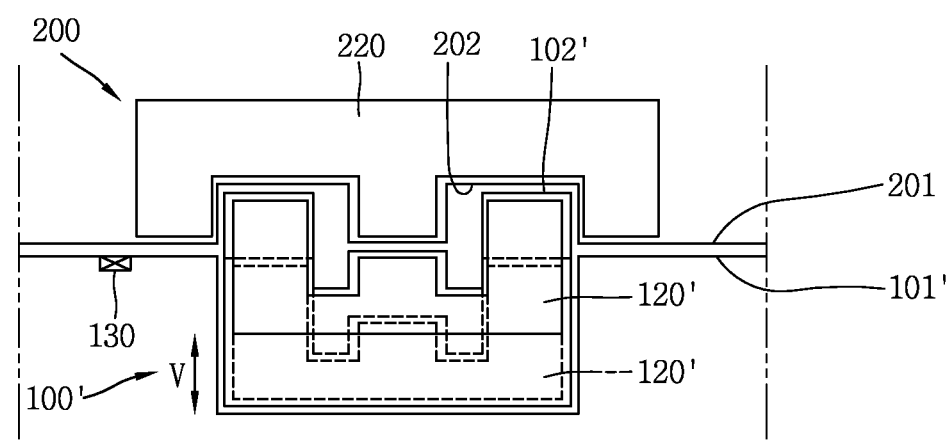
FIG. 7 is a conceptual view showing a wireless power communication system in accordance with another exemplary embodiment.

FIG. 7 is a conceptual view showing a wireless power communication system in accordance with another exemplary embodiment.

Referring to FIG. 7, cores 120' and 220 of the wireless power transmission apparatus 100' and the wireless power receiving apparatus 200 have the same arrangement as the cores 120 and 220.

However, the present embodiment has difference in that the primary core 120' is formed to be lifted in a direction V toward the wireless power receiving apparatus 200. As a result, the primary core 120' is not more extruded to the outside than the outer surface of a housing 101' in an original state.

In another state, the primary core 120' is more extruded than the outer surface of the housing 101' to be in the same state as in the above embodiment. The above-mentioned "another state" means a state that the primary core 120' and the secondary core 220 performs wireless power communication.

The wireless power transmission apparatus 100' or the wireless power receiving apparatus 200 may include a sensor 130 for determining if one of them approaches the other one. When the sensor 130 determines its approaching, the primary core 120' rises toward the secondary core 220.

A driving mechanism using a gear and a motor may be installed inside the housing 101' in order to ascend or descend the primary core 120'. To be specific, when the motor drives a pinion gear, the primary core 120' may be ascended by a rack gear, which is engaged with the pinion gear and installed at the primary core 120'. Since it is apparent that a person having an ordinary skill in this art can fully understand these matters, additional description will not be provided herein.

Figure 8:
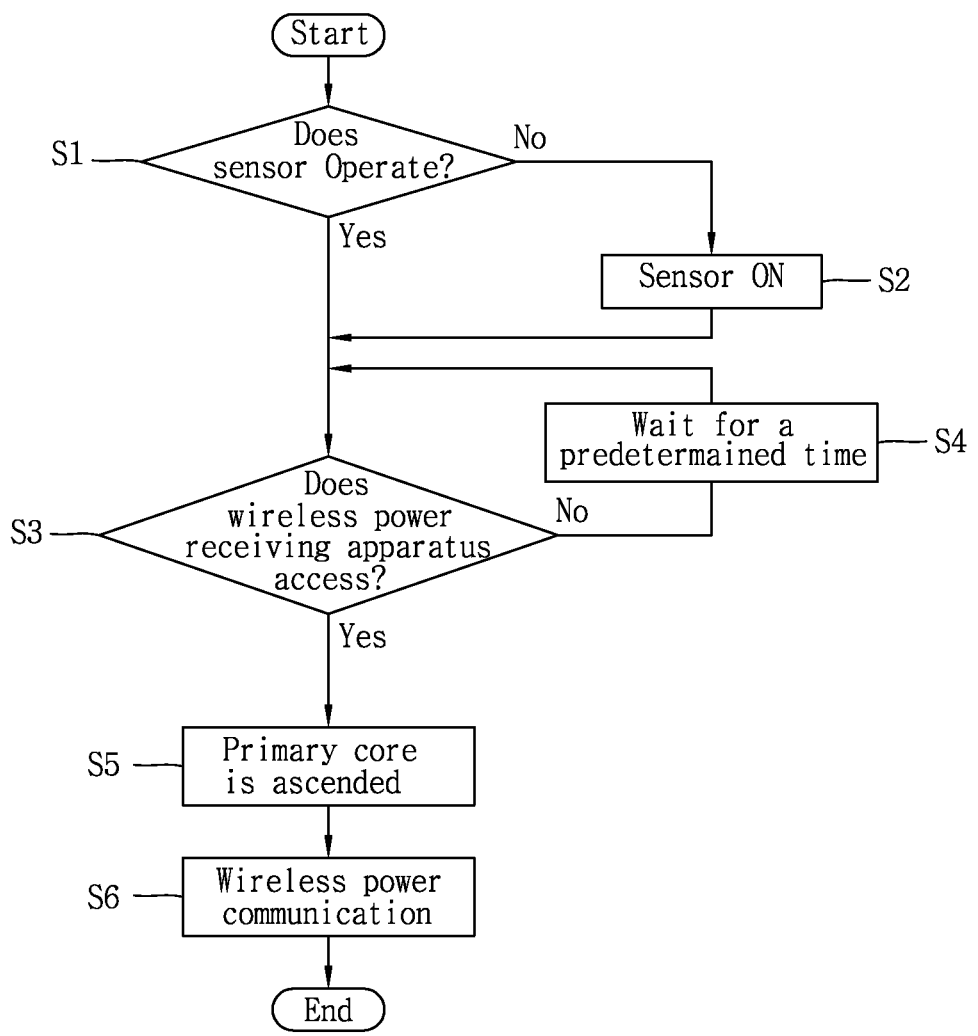
FIG. 8 is a flowchart illustrating an operation process of the wireless power communication system of FIG. 7.

FIG. 8 is a flowchart illustrating an operation process of the wireless power communication system of FIG. 7.

Referring to FIG. 8, the wireless power transmission apparatus 100' may check at a step S1 whether the sensor 130 properly operates.

When the sensor 130 does not properly operate, the sensor may be activated at a step S2.

The activated sensor 130 detects whether the wireless power receiving apparatus 200 approaches to the wireless power transmission apparatus 100' at a step S3. When the sensor 130 does not sense the wireless power receiving apparatus 200, the sensor 130 senses the wireless power receiving apparatus 200 again after waiting for a predetermined time at a step S4.

When the sensor 130 senses the wireless power receiving apparatus 200, the primary core 120' is ascended toward the wireless power receiving apparatus 200 at a step S5.

At a step S6, the wireless power communication between the primary core 120' and the secondary core 220 is performed by ascending of the primary core 120' in a state that the protruded portion 102' is inserted into the recessed portion 202 of the wireless power receiving apparatus 200.

Figure 9:
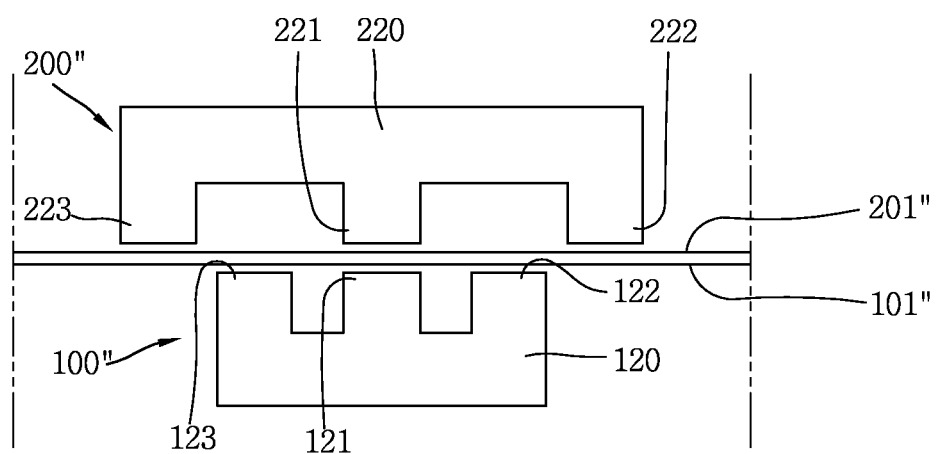
FIG. 9 is a conceptual view showing a wireless power communication system in accordance with still another exemplary embodiment.

FIG. 9 is a conceptual view showing a wireless power communication system in accordance with still another exemplary embodiment.

Referring to FIG. 9, the cores 120 and 220 of the wireless power transmission apparatus 100" and the wireless power receiving apparatus 200" are respectively the same as those in the first exemplary embodiment.

Each outer surface of housings 101" and 201" included in the wireless power transmission apparatus 100" and the wireless power receiving apparatus 200" is formed to be flat and in parallel. Accordingly, the edge protruding portions 122 and 123 of the primary core 120 are not inserted between the secondary middle protruding portion 221 and the edge protruding portions 222 and 223 of the secondary core 220, but the width of the secondary core 220 becomes wider than that of the primary core 120.

According to the wireless power communication system, the wireless power transmission apparatus and the wireless power receiving apparatus therefor, leakage of the magnetic field extended from the primary core to the secondary core may be minimized by the arrangement between the primary core and the secondary core.

It will be apparent that the wireless power communication system, the wireless power transmission apparatus and the wireless power receiving apparatus therefor are not limited to the configurations and the operation methods of the embodiments. Various changes and modifications may be made by selective combinations of all or the part of the embodiments without deviating from the basic concept and scope of the invention as set forth in the appended claims.

What is claimed is:

1. A wireless power communication system, comprising:
  a power transmission apparatus including a charging power supply circuit, a primary coil, and a primary core, wherein the primary core receives the primary coil and the charging power supply circuit is configured to supply a current to the primary coil; and
  a power receiving apparatus including a battery unit, a secondary coil, and a secondary core having a width wider than a width of the primary core, wherein the secondary core receives the secondary coil which outputs a current generated by a magnetic field to charge the battery unit, wherein the magnetic field is induced by the primary coil to the secondary coil, wherein:
  the primary core includes a primary middle protruding portion where the primary coil is wound, and primary edge protruding portions disposed at both sides of the primary middle protruding portion,
  the secondary core includes a secondary middle protruding portion where the secondary coil is wound, and secondary edge protruding portions disposed at both sides of the secondary middle protruding portion, wherein the secondary edge protruding portions of the secondary core are formed to be protruded such that the secondary edge protruding portions surround parts of the primary edge protruding portions of the primary core, and
  the width of the primary core is a distance between the outer lines of the primary edge protruding portions and the width of the secondary core is a distance between the outer lines of the secondary edge protruding portions.

2. The system according to claim 1, wherein the primary middle protruding portion and the secondary middle protruding portions are disposed to be on a single straight line.

3. The system according to claim 2, wherein two adjacent surfaces of the secondary edge protruding portion are disposed to face two adjacent surfaces of the primary edge protruding portion, respectively.

4. The system according to claim 2, further comprising:
  a primary housing receiving the primary core,
  wherein the primary housing includes a protruded portion corresponding to the primary edge protruding portion.

5. The system according to claim 2, further comprising:
  a secondary housing receiving the secondary core,
  wherein the secondary housing includes a recessed portion, into which the primary edge protruding portion is inserted.

6. The system according to claim 1, wherein the secondary coil is configured to output a current transformed by a turns ratio of the primary coil and the secondary coil.

7. The system according to claim 1, further comprising:
  a driving mechanism for driving any one of the primary and secondary cores to move the one toward the other.

8. The system according to claim 7, further comprising:
  a sensor for sensing whether any one of the primary and secondary cores approaches to the other,
  wherein the driving mechanism is driven based on a sensing result of the sensor.

9. A wireless power transmission apparatus, comprising:
  a primary coil where a magnetic field is induced by an applied current such that an output current of a secondary coil is induced;
  a primary core having a width narrower than a width of a secondary core where the secondary coil is wound, wherein the primary coil is wound to the primary core and the winding axis of the primary core, around which the primary coil is wound, is in line with the winding axis of the secondary core, around which the secondary coil is wound; and
  a charging power supply circuit configured to supply the applied current to the primary coil, wherein:
  the primary core includes a primary middle protruding portion where the primary coil is wound, and primary edge protruding portions disposed at both sides of the primary middle protruding portion,
  the secondary core includes a secondary middle protruding portion where the secondary coil is wound, and secondary edge protruding portions disposed at both sides of the secondary middle protruding portion, wherein the secondary edge protruding portions of the secondary core are formed to be protruded such that the secondary edge protruding portions surround parts of the primary edge protruding portions of the primary core, and
  the width of the primary core is a distance between the outer lines of the primary edge protruding portions and the width of the secondary core is a distance between the outer lines of the secondary edge protruding portions.

10. The wireless power transmission apparatus according to claim 9, wherein the edge protruding portion of the primary core is much protruded than the middle protruding portion of the primary core.

11. The wireless power transmission apparatus according to claim 9, further comprising:

a driving mechanism for driving the primary core such that the primary core moves toward the secondary core.

12. The wireless power transmission apparatus according to claim 11, further comprising:
a sensor for sensing whether the secondary core is approached to the primary core,
wherein the driving mechanism is driven based on a sensing result of the sensor.

13. A wireless power receiving apparatus, comprising:
a secondary coil formed to output a current by a magnetic field induced by a current, which is applied to a primary coil;
a secondary core having a width wider than a width of a primary core where the primary coil is wound, wherein the secondary coil is wound to the secondary core and the winding axis of the secondary core, around which the secondary coil is wound, is in line with the winding axis of the secondary core, around which the primary coil is wound; and
a battery unit configured to be charged with the current output by the secondary coil, wherein:
the primary core includes a primary middle protruding portion where the primary coil is wound, and primary edge protruding portions disposed at both sides of the primary middle protruding portion,
the secondary core includes a secondary middle protruding portion where the secondary coil is wound, and secondary edge protruding portions disposed at both sides of the secondary middle protruding portion, wherein the secondary edge protruding portions of the secondary core are formed to be protruded such that the secondary edge protruding portions surround parts of the primary edge protruding portions of the primary core, and
the width of the primary core is a distance between the outer lines of the primary edge protruding portions and the width of the secondary core is a distance between the outer lines of the secondary edge protruding portions.

14. The wireless power receiving apparatus according to claim 13, wherein the edge protruding portion of the secondary core is less protruded than the middle protruding portion of the secondary core.

* * * * *